United States Patent
Robinson et al.

(10) Patent No.: US 10,483,532 B2
(45) Date of Patent: Nov. 19, 2019

(54) BINDER-FREE AND CARBON-FREE NANOPARTICLE CONTAINING COMPONENT, METHODS AND APPLICATIONS

(71) Applicant: CORNELL UNIVERSITY, Ithaca, NY (US)

(72) Inventors: Richard D. Robinson, Ithaca, NY (US); Don-Hyung Ha, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

(21) Appl. No.: 14/419,735

(22) PCT Filed: Aug. 6, 2013

(86) PCT No.: PCT/US2013/053735
§ 371 (c)(1),
(2) Date: Feb. 5, 2015

(87) PCT Pub. No.: WO2014/025743
PCT Pub. Date: Feb. 13, 2014

(65) Prior Publication Data
US 2015/0188128 A1     Jul. 2, 2015

Related U.S. Application Data (60) Provisional application No. 61/680,414, filed on Aug. 7, 2012.

(51) Int. Cl.
*H01M 4/36*     (2006.01)
*H01M 4/38*     (2006.01)
(Continued)

(52) U.S. Cl.
CPC ............ *H01M 4/366* (2013.01); *C25D 13/02* (2013.01); *H01G 9/042* (2013.01); *H01G 9/048* (2013.01);
(Continued)

(58) Field of Classification Search
CPC .......... B82Y 30/00; B82Y 40/00; C25D 13/02
See application file for complete search history.

(56) References Cited

U.S. PATENT DOCUMENTS

| 4,225,408 A | 9/1980 | Barlow et al. |
| 7,118,802 B2 | 10/2006 | Simon et al. |

(Continued)

FOREIGN PATENT DOCUMENTS

| CN | 103175879 A | 6/2013 |
| KR | 20060030391 | 4/2006 |

(Continued)

OTHER PUBLICATIONS

Huamin Kou, "Fabrication of Hollow ZnO microsphere with Zinc Powder Precursor", 2006, Elsevier, Materials Chemistry and Physics 99, 325-328 (Year: 2006).*

(Continued)

*Primary Examiner* — Imran Akram
(74) *Attorney, Agent, or Firm* — Bond, Schoeneck & King, PLLC; Blaine Bettinger; William Greener (57) ABSTRACT

A method for forming an adherent metal based nanoparticle material layer upon a substrate includes an electrophoretic deposition method for depositing a metal nanoparticle material layer upon the substrate. The metal nanoparticle material layer may then be treated to form the adherent metal based nanoparticle material layer comprising a material selected from the group consisting of a metal oxide material, a metal nitride material, a metal oxynitride material and a metal chalcogenide material. The method is particularly useful for (Continued)

fabricating a battery electrode comprising a $Co_3O_4$ nanoparticle material layer, for use within a lithium ion battery. Other applications include fuel cells, capacitors and catalytic reactors.

12 Claims, 7 Drawing Sheets

(51) Int. Cl.

| | | |
|---|---|---|
| H01M 4/583 | (2010.01) | |
| H01G 9/048 | (2006.01) | |
| H01M 4/90 | (2006.01) | |
| H01G 9/145 | (2006.01) | |
| H01G 9/042 | (2006.01) | |
| C25D 13/02 | (2006.01) | |
| H01M 4/58 | (2010.01) | |
| H01G 11/30 | (2013.01) | |
| H01G 11/46 | (2013.01) | |
| H01M 4/04 | (2006.01) | |
| H01M 4/131 | (2010.01) | |
| H01M 4/136 | (2010.01) | |
| H01M 4/1391 | (2010.01) | |
| H01M 4/1397 | (2010.01) | |
| H01M 4/525 | (2010.01) | |
| H01M 4/88 | (2006.01) | |

(52) U.S. Cl.
CPC ............ *H01G 9/145* (2013.01); *H01G 11/30* (2013.01); *H01G 11/46* (2013.01); *H01M 4/0457* (2013.01); *H01M 4/0471* (2013.01); *H01M 4/131* (2013.01); *H01M 4/136* (2013.01); *H01M 4/1391* (2013.01); *H01M 4/1397* (2013.01); *H01M 4/38* (2013.01); *H01M 4/581* (2013.01); *H01M 4/583* (2013.01); *H01M 4/9041* (2013.01); *H01M 4/525* (2013.01); *H01M 4/5815* (2013.01); *H01M 4/8853* (2013.01); *H01M 4/9016* (2013.01); *Y02E 60/13* (2013.01)

(56) References Cited

U.S. PATENT DOCUMENTS

| | | | |
|---|---|---|---|
| 7,553,341 | B2 | 6/2009 | Pan et al. |
| 7,662,316 | B2 | 2/2010 | Zaban et al. |
| 7,790,067 | B2 | 9/2010 | Zaban et al. |
| 8,361,224 | B2 | 1/2013 | Hong et al. |
| 8,405,138 | B2 | 3/2013 | Dickerson et al. |
| 8,409,906 | B2 | 4/2013 | Guo et al. |
| 2002/0037451 | A1 | 3/2002 | Eguchi et al. |
| 2003/0059540 | A1 | 3/2003 | Berni et al. |
| 2005/0032635 | A1* | 2/2005 | Yu .................. B82Y 30/00 502/180 |
| 2006/0030483 | A1* | 2/2006 | Jang .............. B01J 20/28021 502/400 |
| 2006/0040168 | A1* | 2/2006 | Sridhar ............ B82Y 30/00 429/482 |
| 2007/0166603 | A1* | 7/2007 | Nakanishi ........ B82Y 30/00 429/450 |
| 2008/0014621 | A1* | 1/2008 | Kim ................ B01J 13/02 435/168 |
| 2009/0032104 | A1* | 2/2009 | Lee ................ H01G 9/2031 136/261 |
| 2009/0311513 | A1 | 12/2009 | Hu et al. |
| 2010/0227255 | A1* | 9/2010 | Nakanishi ........ B82Y 30/00 429/497 |
| 2010/0233812 | A1* | 9/2010 | Sun ................ B01D 67/0039 435/401 |
| 2011/0070495 | A1 | 3/2011 | Ban et al. |
| 2011/0163296 | A1* | 7/2011 | Pace ................ B82Y 15/00 257/24 |
| 2011/0192450 | A1 | 8/2011 | Liu et al. |
| 2012/0097224 | A1* | 4/2012 | Guo ................ B82Y 30/00 136/255 |
| 2012/0242987 | A1 | 11/2012 | Haag |
| 2012/0302044 | A1 | 11/2012 | Haag |
| 2012/0316060 | A1* | 12/2012 | Shao ............... H01M 4/921 502/330 |
| 2013/0089790 | A1 | 4/2013 | Byon et al. |
| 2013/0101830 | A1 | 4/2013 | Hagedorn et al. |
| 2013/0150231 | A1 | 6/2013 | Hagedorn et al. |
| 2013/0177838 | A1* | 7/2013 | Wang ............... B01J 23/52 429/524 |

FOREIGN PATENT DOCUMENTS

| | | | |
|---|---|---|---|
| WO | 2009100803 | A3 | 8/2009 |
| WO | 2012037445 | A3 | 3/2012 |
| WO | 2013016339 | A3 | 1/2013 |

OTHER PUBLICATIONS

International Search Report Form PCT/ISA/220, International Application No. PCT/US2013/053735, pp. 1-4, Search completed Dec. 9, 2013.

Cai, Y, et al., 2013, "Nanoparticle-Induced Grain Growth of Carbon-Free Solution-Processed CuIn(S,Se)2 Solar Cell With 6% Efficiency", Energy Research Institute, Nanyang Technological University, Research Techno Plaza, Singaporte 637553, Retrieved from: http://www.ncbi.nlm.nih.gov/pubmed/23428066, Abstract.

Guo, Wei, et al., 2011, "Electrophoretic Deposition of Cu—In Composite Nanoparticle Thin Films for Fabrication of Cuinse Solar Cells", Proc. SPIE 8104, Nanostructured Thin Films IV, 81040W (Sep. 26, 2011); doi:10.1117/12.894109, Retrieved from: http://proceedings.spiedigitallibrary.org/proceeding.aspx?articleid=1272781, Abstract.

Liu, Dawei, and Cao, Guozhong, Mar. 2010, "Engineering Nanostructured Electrodes and Fabrication of Film Electrodes for Efficient Lithium Ion Intercalation", Energy & Environmental Science, vol. 3, pp. 1218-1237, DOI: 10.1039/b922656g.

Chiu et al., 2011, "High Efficiency Flexible Dyesensitized Solar Cells by Multiple Electrophoretic Depositions", Journal of Power Sources, Article 196, pp. 3683-3687.

News.Cornell, Oct. 30, 2012, "Materials Scientists Make Additive-Free Battery Electrodes With Nanoparticles", Cornell Chronicle, Jul. 10, 2013, 312 College Ave., Ithaca, NY 14850, Retrieved From: http://news.cornell.edu/stories/2012/10/nanoparticles-improve-lithium-battery-electrodes.

Tummala, R. et al., Feb. 1, 2012, "Binder Free, Porous and Nanostructured CO3O4 Anode for Li-Ion Batteries From Solution Precursor Plasma Deposition", Journal of Power Sources, vol. 199, pp. 270-277; doi:10.1016/j.jpowsour.2012.02.071.

Tummala, R. et al., Jul. 1, 2012, "Nanostructured CO3O4 Electrodes for Supercapacitor Applications From Plasma Spray Technique", Journal of Power Sources, vol. 209, pp. 44-51; doi:10.1016/j.jpowsour.2012.02.071.

* cited by examiner

BINDER-FREE AND CARBON-FREE NANOPARTICLE CONTAINING COMPONENT, METHODS AND APPLICATIONS

CROSS-REFERENCE TO RELATED APPLICATIONS

This application is a U.S. national phase filing of PCT/US2013/053735, filed Aug. 6, 2013 and is related to, and derives priority from, U.S. Provisional Patent Application Ser. No. 61/680,414, filed 7 Aug. 2012 and titled Binder-free and Carbon-free Nanoparticle Containing Component, Method and Applications, the contents of which is incorporated herein fully by reference.

STATEMENT OF GOVERNMENT INTEREST

The research that lead to the embodiments as described herein, and the invention as claimed herein, was funded by: (1) the United States National Science Foundation under cooperative agreement 1120296; and (2) the United States Department of Energy under grant number DE-SC0001086. The United States Government has rights in the invention as claimed herein.

BACKGROUND

Field of the Invention

Embodiments relate generally to nanoparticle containing components. More particularly, embodiments relate to robust nanoparticle containing components that may be used as components including but not limited to electrode components within applications including but not limited to lithium ion battery applications.

Description of the Related Art

Prominent in the field of energy storage technology is the lithium ion battery. The lithium ion battery is desirable within the energy storage technology field insofar as the lithium ion battery provides a rechargeable battery with a generally elevated energy storage capacity.

Since lithium ion batteries are likely to continue to be popular due to their unique properties, including in particular a generally elevated energy storage capacity, desirable also are additional novel lithium ion battery components.

SUMMARY

Embodiments provide a nanoparticle containing component that may be used as an electrode component within a battery construction such as but not limited to a lithium ion battery construction, and a method for fabricating the nanoparticle containing component that may be used as the electrode component within the battery construction such as but not limited to the lithium ion battery construction.

A nanoparticle containing component in accordance with the embodiments may also be used in alternative applications (i.e., in comparison with lithium ion battery applications) including but not limited to battery (in general) applications, fuel cell applications, capacitor (including but not limited to super-capacitor) applications and catalytic reactor applications.

In particular, the method for fabricating the nanoparticle containing component in accordance with the embodiments uses an elecrophoretic deposition (EPD) of a (generally metal or metal based) nanoparticle material layer upon a substrate to provide an adherent (generally metal or metal based) nanoparticle material layer upon the substrate, absent a binder material or a carbon material. If deposited initially as a metal nanoparticle material layer rather than a metal based nanoparticle material layer, the adherent metal nanoparticle material layer may be further treated or reacted in a separate treatment step or reaction step to form a treated or reacted adherent metal based nanoparticle material layer upon the substrate, absent the binder material or the carbon material.

Within the context of the embodiments as disclosed and the invention as claimed a "metal nanoparticle material layer" is intended as a nanoparticle material layer comprising a pure transition metal or a pure transition metal alloy. In contrast, a "metal based nanoparticle material layer" is intended as comprising a transition metal based material selected from the group including but not limited to a transition metal oxide material, a transition metal nitride material, a transition metal oxynitride material and a transition metal chalcogenide (i.e., sulfur, selenium or tellurium compound) material.

Within the context of the embodiments as described and the invention as claimed, a "transition metal" is intended as any one or more transition metal as listed in the Periodic Table of the Elements (i.e., group 1b to group 7b and group 8) including atomic numbers 21-30, 39-48 and 72-80. The embodiments also contemplate as a smaller group for a candidate "transition metal" any one or more transition metal as listed in the Periodic Table of the Elements (i.e., group 1b to group 7b and group 8), but excluding vanadium, manganese, iron, titanium and nickel.

Within the context of the embodiments as described and the invention as claimed a "binder material" is intended typically as a polymer binder material that is typically used when fabricating an electrode for a lithium ion battery. Such a binder material may comprise, but is not necessarily limited to, a polyvinylidene fluoride binder material.

Within the context of the embodiments as described and the invention as claimed a "carbon material" is intended typically as a carbon containing material that is typically used when fabricating an electrode for a lithium ion battery. Such a carbon material may comprise, but is not necessarily limited to an amorphous carbon material or a graphitic carbon material.

The foregoing methodology for fabricating a nanoparticle containing component in accordance with the embodiments may be used to provide a lithium ion battery electrode with an adherent cobalt oxide nanoparticle material layer absent a binder material or a carbon material. Alternatively, the foregoing methodology may also be used to provide a lithium ion battery electrode with an adherent copper sulfide nanoparticle material layer or an adherent iron oxide nanoparticle material layer. Adherence within the context of the embodiments is as described below measured using a tape transfer test where superior adhesion is indicated by no transfer of a nanoparticle material layer to an adhesive tape.

A particular apparatus in accordance with the embodiments includes a component comprising: (1) a substrate; and (2) at least one of a metal nanoparticle material layer and a metal based nanoparticle material layer located over the substrate and absent a binder material and a carbon material. The apparatus is selected from the group consisting of a battery, a fuel cell, a capacitor and a catalytic reactor (i.e., generally but not limited to an industrial process reactor that may also include electrocatalytic capabilities).

A particular battery in accordance with the embodiments includes a substrate. The battery also includes a transition metal based nanoparticle material layer located upon the substrate and absent a binder material or a carbon material.

A particular method in accordance with the embodiments includes forming upon a substrate a metal nanoparticle material layer having a first morphology while using an electrophoretic deposition method. This particular method also includes treating the metal nanoparticle material layer to provide a metal based nanoparticle material layer having a second morphology different than the first morphology.

BRIEF DESCRIPTION OF THE DRAWINGS

The objects, features and advantages of the embodiments are understood within the context of the Detailed Description of the Non-Limiting Embodiments, as set for the below. The Detailed Description of the Non-Limiting Embodiments is understood within the context of the accompanying drawings, that form a material part of this disclosure, wherein:

FIG. 3 shows materials characterization of EPD-formed nanoparticle electrodes: (a) XRD spectra of the samples from as-synthesized Co NPs to two phases of cobalt oxide through calcination at 200° C. in air. The vertical bars correspond to references of ε-Co, CoO (JCPDS No. 48-1719), and $Co_3O_4$ (JCPDS No. 42-1467) phases, respectively. The 30 minute oxidation sample is mixed phases of CoO and $Co_3O_4$. The 1.5 hour sample is fully converted to $Co_3O_4$. TEM images of (b) as synthesized ε-Co NPs, (c) NPs calcinated for 30 mins at 200° C., and (d) NPs calcinated for 1.5 hours at 200° C. XRD indicates the phase of samples shown in d is the desired $Co_3O_4$. (e) HRTEM image and FFT (inset) of samples shown in b (ε-Co NP) and (f) HRTEM image of samples shown in d. ($Co_3O_4$) Yellow (lighter shade) dotted circles in (f) indicate each crystalline regions of polycrystalline shell. Scale bar is 50 nm in b, c, and d, and 2 nm in e and f. (g and h) SEM images of EPD film: (g) before and (h) after oxidation shows dense network of NPs which should provide good electrical conducting pathways. (i) TEM image of NPs scraped off from oxidized EPD film. Hollow particles are evident in these films. Scale bar is 100 nm for g and h and 25 nm for i.

DETAILED DESCRIPTION OF THE NON-LIMITING EMBODIMENTS

1. General Considerations

The description that follows most particularly describes the embodiments within the context of locating and forming an adherent cobalt metal nanoparticle material layer absent a binder material or a carbon material upon a copper electrode. The adherent cobalt metal nanoparticle material layer is subsequently oxidized to form an adherent cobalt oxide nanoparticle material layer absent the binder material or the carbon material upon the copper electrode. This resulting nanoparticle containing component may then be used for a lithium ion battery electrode.

However, the embodiments are not intended to be so limited to the cobalt oxide nanoparticle material layer or the lithium ion battery electrode as indicated above. Rather, the embodiments contemplate the fabrication of substrates having located and formed thereupon: (1) highly adherent metal nanoparticle material layers absent a binder material or a carbon material; or (2) highly adherent metal based nanoparticle material layers absent a binder material or a carbon material, where: (a) the highly adherent metal nanoparticle material layers or metal based nanoparticle material layers may comprise other than a cobalt metal nanoparticle material layer or a cobalt oxide nanoparticle material layer; (b) the substrate may comprise other than a copper substrate; and (c) the resulting nanoparticle containing component may be used as a component other than an electrode component within an application other than a battery application.

Thus, the embodiments contemplate locating and forming upon a substrate selected from the group including but not limited to a conductor substrate, a semiconductor substrate and (given appropriate conductor layer lamination) a dielectric substrate a highly adherent metal nanoparticle material layer or a highly adherent metal based nanoparticle material layer absent a binder material or a carbon material. Within the context of the embodiments the substrate is typically an optically opaque substrate. Within the context of the embodiments, a metal included within the highly adherent metal nanoparticle material layer or highly adherent metal based nanoparticle material layer is selected from the group of all transition metals as described above within the Summary. Such a resulting metal nanoparticle containing component or metal based nanoparticle containing component may be used as a component including but not limited to an electrode component within an application including but not limited to a battery application, a fuel cell application, a capacitor application and a catalytic reactor application. Within the context of the embodiments, the metal nanoparticle containing component or the metal based nanoparticle containing component is typically housed within an optically opaque housing.

In general, these broader embodiments contemplate that metal, metal oxide, metal nitride, metal oxynitride and metal chalcogenide nanoparticle material layers may be formed over a substrate to a thickness from about 1 to about 5000 nanometers. The related oxidation, nitridation, oxynitridation or chalcogenization reaction, if utilized to form from the adherent metal nanoparticle material layers the adherent metal oxide, metal nitride, metal oxynitride or metal chalcogenide material layers may be undertaken at a temperature from about 200 to about 300 degrees centigrade, if an elevated temperature is needed for such related oxidation, nitridation, oxynitridation or chalcogenization reaction. The electrophoretic deposition method that may be used for forming the adherent metal nanoparticle material layers or metal based nanoparticle material layers may use an electrophoretic deposition potential from about 150 to about 600 volts. Metal, metal oxide, metal nitride, metal oxynitride and metal chalcogenide material layers in accordance with the embodiments will typically have a nanoparticle size from about 5 to about 20 nanometers, generally spherical and hollow, although other shapes are also considered.

As an extension, the general embodiments also contemplate the possibility of further secondarily treating a metal oxide, a metal nitride, a metal oxynitride or metal chalcogenide nanoparticle material layer in accordance with the embodiments to provide a further treated metal oxide, metal nitride, metal oxynitride or metal chalcogenide material layer. A particular example of such a further treated metal oxide nanoparticle material layer may be, for example and without limitation, a lithiated cobalt oxide nanoparticle material layer.

2. Specific Embodiment

Figure 1:
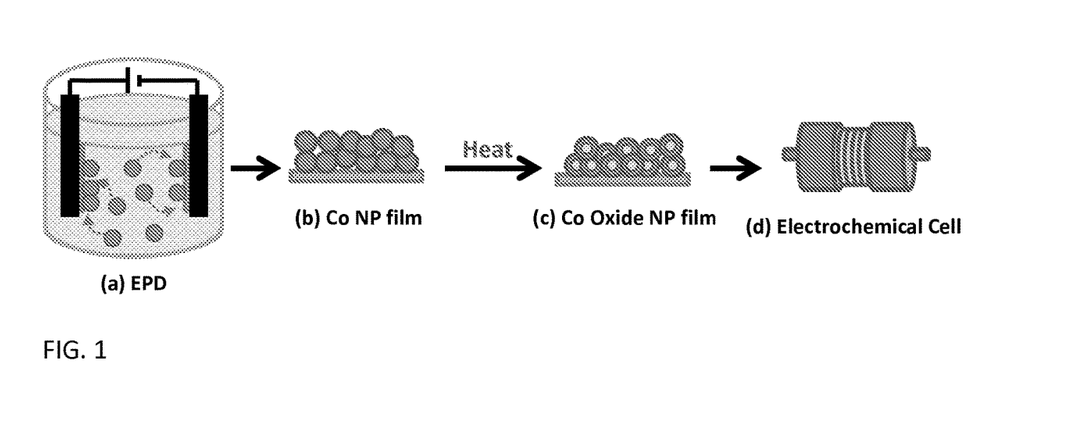
FIG. 1 shows a schematic diagram of a process for fabrication of binder-free and carbon-free nanoparticle film battery electrodes: (a) electrophoretic deposition (EPD) apparatus for depositing cobalt nanoparticle (NP) films. A beaker with cobalt nanoparticles dispersed in a solvent. On each electrode, there is a copper current collector, which acts as the substrate for the NP electrode. After the plates are immersed in the NP solution a voltage is applied to the plates. The voltage induces cobalt NP deposition on both electrodes. (b) The Co NP film formed on copper current collector is calcinated at 200° C. in air and become (c) cobalt oxide NP film. (d) Finally, this film is assembled into an electrochemical cell.

A specific embodiment provides a nanoparticle Li-ion battery electrode by using electrophoretic deposition of monodisperse nanoparticles, without the use of binders or carbon black. To obtain monodisperse particles one may synthesize cobalt nanoparticles through organic-phase colloidal nanocrystal synthesis methods, which are known to provide well-controlled shapes and sizes through the use of surfactant ligands. The cobalt nanoparticles are assembled into films through EPD and then oxidized in air, leading to a hollow $Co_3O_4$ nanoparticle film as illustrated in FIG. 1, which is mechanically very robust. One may find that use of EPD to form the binder-free, carbon-free films results in good electrical connectivity, while the commonly used drop-casted films of the same particles, calcinated under identical conditions, have poor electrical contact and poor battery performance. This EPD film in accordance with the embodiments also shows better mechanical stability and comparable electrochemical performance to a slurry coating film prepared by conventional methods. These additive-free $Co_3O_4$ nanoparticle films show high gravimetric capacity compared to the theoretical capacity value and low degradation over many charge/discharge cycles. Additionally the volumetric capacity (>2100 mAh/cm$^3$), based on the volume of $Co_3O_4$ nanoparticle films, is 2.5 times higher than graphite (~800 mAh/cm$^3$) and higher than other nanomaterials previously reported. Nanoparticle-film battery electrodes made without using binders and carbon black additives in accordance with the embodiments show very high gravimetric (>830 mAh/g) and volumetric capacities (>2100 mAh/cm$^3$) even after 50 cycles.

Figure 2:
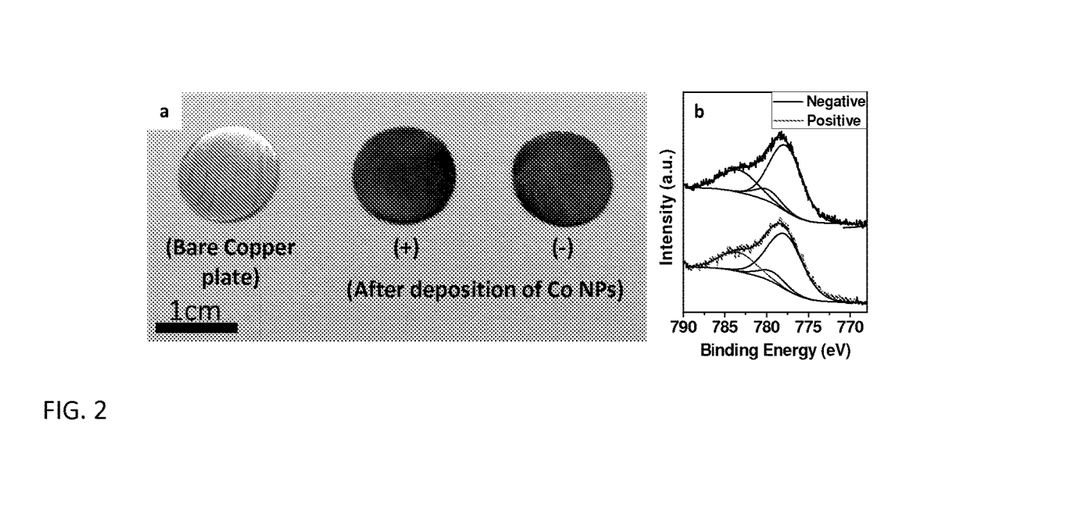
FIG. 2 shows an EPD-formed nanoparticle film: (a) Photograph of bare copper plate before NP deposition (left) and after deposition on (center) positive electrode and (right) negative electrode which show a thick, black NP film. (b) High-resolution Co $2p_{3/2}$ XPS spectra of Co EPD film formed on positive (lower lighter shaded red line) and negative (upper darker shaded black line) electrode.

The ε-Co nanoparticle (NP) synthesis may follow standard procedures. Specifically, a $N_2$ flushed flask was filled with tri-n-octylphosphine oxide (TOPO) (0.1 g). After adding 0.09 g (0.32 mmol) of oleic acid dissolved in 12 mL of 1,2-dichlorobenzene, the solution was heated. When the temperature of the solution reached 180° C., 0.52 g (1.52 mmol) of $Co_2(CO)_8$ dissolved in 4 mL of 1,2-dichlorobenzene was quickly injected. After the reaction progressed for 5 mins, the heating mantle was removed and the reaction solution was quenched in a water bath. The cobalt NPs were purified by adding ethanol and centrifuged. The supernatant was removed, and the NPs were re-dispersed in hexanes. This precipitation/re-dispersion process was performed twice overall. Generally, additional washing leads to more charges on the NPs, which is important for the electrophoretic deposition process. Colloidal ε-Co NPs were assembled onto a film through electrophoretic deposition (EPD). As shown in FIG. 1, a copper current collector plate was attached to a stainless steel electrode plate, for each polarity (+ and −). These two copper plates faced each other and were separated by 2 mm. The electrodes were immersed in a solution of concentrated NP (0.1-1 mg/ml), dispersed in a solvent. A DC voltage (~150 to 600 V) was then applied to these electrodes. Once the voltage was applied a NP film forms on the electrodes and the NP solution turns from dark to clear. Deposition proceeded until the NP solution was very clear (~10 to 30 mins depending on concentration and voltage). A film was formed on both the positive electrode and negative electrode. FIG. 2a clearly shows the black NP film after the deposition of NPs. The film on the positive electrode was generally slightly thicker than that of the negative electrode (~20%-80%), which indicates that more particles were negatively charged in the solvent. The thickness of the films can be made to be a few hundreds of nanometers to a few microns by controlling the concentration and deposition time. Generally, the polarities of these two electrodes are reversed several times during deposition in order to secure a similar thickness on both electrodes.

To compare the chemistry of the nanoparticle films formed on the opposite electrodes during EPD, XPS (X-ray photoelectron spectroscopy) with monochromated aluminum K-alpha X-rays (1486.6 eV) was utilized. FIG. 2b shows Co $2p_{3/2}$ XPS spectra of the samples fabricated on positive electrode (lower trace red line, lighter shade) and negative electrode (upper trace black line, darker shade). Both spectra exhibit the strong Co $2p_{3/2}$ peak around 778.4 eV confirming that both samples contained $Co^0$ for major component. Each spectrum was deconvoluted to three Gaussian peaks that correspond to $Co^0$ at 778.1 eV and $Co^{2+}$ at 780.2 and 783.9 eV (shakeup satellites) indicating the surface oxidation of CoO phase. Both samples show the identical amount of surface oxidation and energy shifts, confirming that the opposite polarity of e-field during EPD does not influence the chemistry of the NPs.

Figure 3:
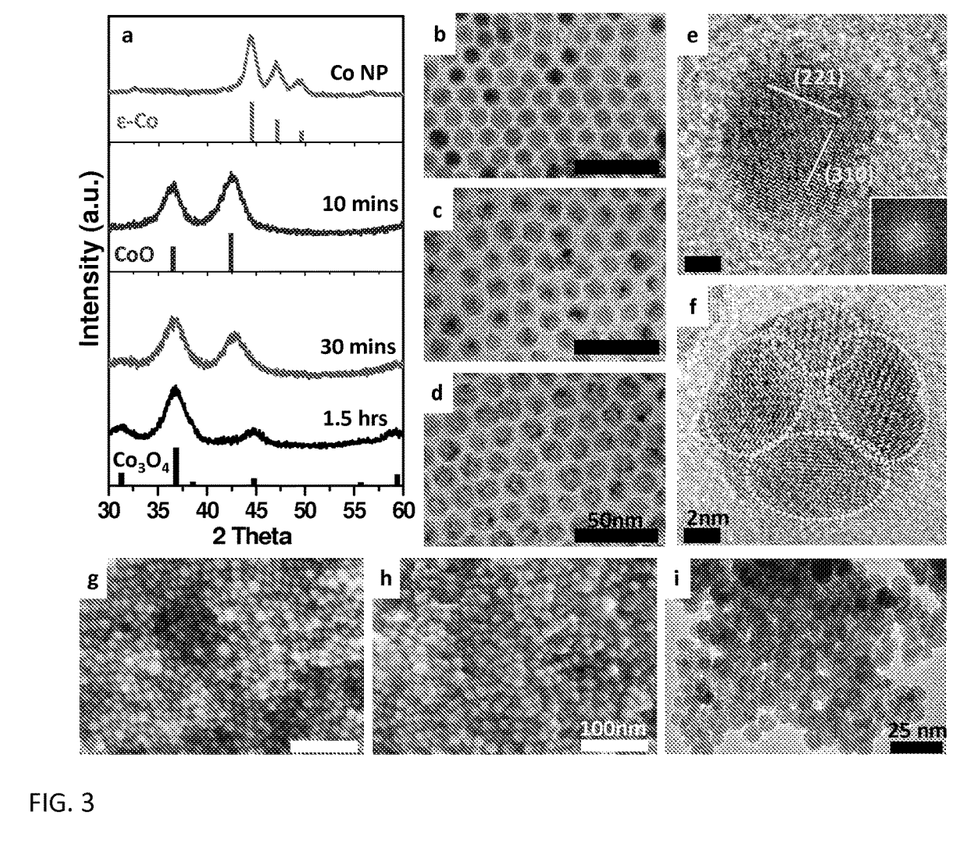

To form the cobalt oxide used as an electrode in Li-ion batteries the ε-cobalt NP films were oxidized in air, as shown in FIG. 1c. XRD data show that the NPs transform from ε-cobalt to two phases of cobalt oxide through the calcination process in air, as illustrated in FIG. 3a. The $Co_3O_4$ phase is the useful phase for lithium ion battery anodes since it has one of the highest theoretical capacities among metal oxides. The XRD peaks of the initial cobalt NPs matched well with the reference standard peaks of the ε-cobalt phase, which is the common phase for cobalt metal in NPs. After heating the Co NP film in the furnace at 200° C. for 10 mins, Co NPs oxidize and the major phase becomes CoO. The XRD spectrum of the sample calcinated for 10 mins shows broader peaks than those of ε-Co NPs, which indicates the decreased grain size and reduced long range order from the oxidation. Through further heating, the CoO NPs begin to transform to the $Co_3O_4$ phase. The XRD pattern of the sample that is calcinated for 30 mins at 200° C. shows two peaks around 37° and 43°, which correspond to the strongest diffraction planes for $Co_3O_4$ and CoO phase respectively. After heating this intermediate stage ($CoO+Co_3O_4$) for 1.5 hours the CoO strongest peak was no longer detected and the NPs have transformed into $Co_3O_4$ phase. Longer oxidation times do not lead to other oxygen rich phases, such as $Co_2O_3$.

Comparing the air oxidation of cobalt to solution-phase oxidation one may note that, unsurprisingly, the air calcination process more effectively converts the metal to the oxide phases. In the solution-phase method, the Co NPs react with an $O_2$/Ar mixture gas for 3 hours at 455 K and result in only the CoO phase.

TEM characterization of the morphological evolution during the transformation from cobalt to cobalt oxides showed monodisperse ε-Co NPs that transformed into hollow final products. The studies were conducted by depositing ε-Co NPs on a carbon-coated TEM grid and heating the grid to 200° C. in air. The initial ε-Co NPs were a monodisperse spherical shape and monodisperse size (size: 9.5 nm, std. dev 8%) as illustrated in FIG. 3b. After 30 minutes heating at 200° C., the NPs, as shown in FIG. 3c, had a dark center that is commonly seen at the onset of the nanoscale Kirkendall effect as the transformation is initiated and a shell begins to develop. The nanoscale Kirkendall effect is due to the asymmetric diffusion rates of atoms and ions in a material and results in hollow nanoparticles. After heating for 1.5 hours the sample converted to $Co_3O_4$ and the NPs exhibited the Kirkendall hollowing with bigger NP size (size: 13.4 nm, std. dev 9%), as illustrated in FIG. 3d. Through this transition progression, the single crystalline cobalt NPs transformed to polycrystalline hollow NPs, as confirmed by HRTEM, as illustrated in FIG. 3e and FIG. 3f. Scherrer analysis of the grains also showed a decrease in crystal size from ~10 nm in initial cobalt NP to ~4.3 nm in $Co_3O_4$ NP, as illustrated in FIG. 3a.

SEM images of the films showed a random network of deposited particles that increases in density after the oxidation process. The Co NP film formed by EPD showed an assembly of NPs separated by surfactant ligands as illustrated in FIG. 3g. After oxidation for 1.5 hours at 200° C. discrete NPs were still evident in the film, but the particles then formed a denser network due to the decrease in interparticle spacing as illustrated in FIG. 3h. TEM samples of the interior were prepared to ensure that the NPs in the interior of the film are similar to those shown on the surface with the SEM images, i.e., not sintered and exist as discrete particles. TEM results of the NPs from oxidized film showed aggregation, but the NPs were not sintered into bulk material, as illustrated in FIG. 3i.

These EPD films showed very rigid contact between the NP film and the copper current collector for both cobalt NP films and the films formed after oxidation. Both the EPD as-deposited cobalt film and the oxidized film were no longer soluble in typical NP solvents such as hexane, even with an ultra-sonication procedure. This excellent physical connectivity property might be the source of good electrical conducting pathways.

Elemental analysis of carbon atoms was performed for both the initial cobalt nanoparticles and the cobalt oxide nanoparticles, in order to investigate the change of the organic surfactant ligands that were initially present on the surface of the cobalt nanoparticles. The elemental analysis was performed for carbon by high temperature combustion followed by IR detection. The initial carbon weight percent of cobalt NP sample was about 6.7 wt % and this carbon weight significantly decreased to 0.84 wt % after the oxidation of the sample at 200° C. in air, indicating that most of the organic components were burned off through the heating process. The 0.84 wt % of carbon was significantly less than that was required for monolayer coverage of carbon on the 14 nm sized NPs.

Thickness measurements showed a contraction of the volume after oxidation, as illustrated in Table 1. Three cobalt NP films with different thicknesses—470 nm, 1000 nm, and 1500 nm—were prepared through EPD. Surprisingly, all the samples showed about a 25% reduction in thickness after oxidation despite the increased particle sizes from the Kirkendall hollowing, as illustrated in Table 1. Even when the shrinkage of the volume due to the organic ligands elimination was considered, this 25% reduction was surprising because the NP size actually increased about 40% during oxidation and the density of $Co_3O_4$ (6.11 g/cm³) was also lower than that of ε-Co (8.64 g/cm³). This contraction of the film implies that the NPs are filling the porous spaces and settling on more stable sites during oxidation process.

TABLE 1

| Sample | Thickness Cobalt NP film | Thickness Cobalt oxide NP film | Volume change after oxidation | Density of $Co_3O_4$ NP Film |
|---|---|---|---|---|
| 1 | 465 nm | 347 nm | 25% reduction | 2.72 g/cm$^3$ |
| 2 | 1001 nm | 725 nm | 28% reduction | 2.12 g/cm$^3$ |
| 3 | 1497 nm | 1136 nm | 24% reduction | 2.23 g/cm$^3$ |

The embodied EPD-formed $Co_3O_4$ NP films showed higher density than the tap density of a mixture of the same $Co_3O_4$ NPs with carbon black and polyvinylidene fluoride (conventional slurry method): 2.12-2.72 g/cm$^3$ for the EPD films versus 1.76 g/cm$^3$ for the mixture and its dried slurry, based on the $Co_3O_4$ NP mass. The EPD nanoparticle films also showed higher density than the $Co_3O_4$ NP dried slurry mixture pressed under 160 MPa (2.18 g/cm$^3$).

Figure 4:
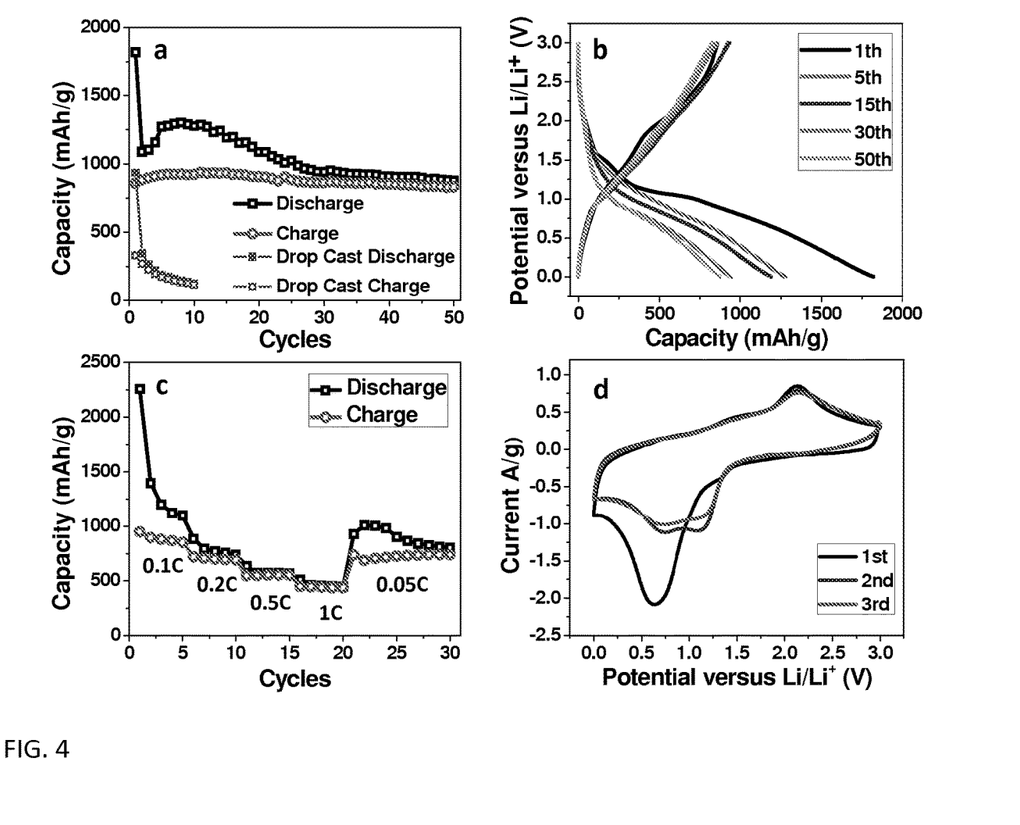
FIG. 4 shows electrochemical performance of EPD $Co_3O_4$ NP films without carbon black and polymeric additives: (a) Capacity retention at C/20 rate showing the charge (red circles) and discharge (black squares). The purple solid squares and purple open squares show the discharge and charge capacities of drop casted film, respectively. (b) Galvanostatic charge-discharge curves and (c) cycling performance at various current rates showing charge (red circles) and discharge (black squares). (d) Cyclic voltammetry at 50 mV/s rate.

The electrochemical performance of these additive-free $Co_3O_4$ nanoparticle films was tested by using the films as a working electrode in a Swagelok-type electrochemical cells. The cells were completed by using Li foil as the counter electrode, 1 M LiPF$_6$ in a 50:50 w/w mixture of ethylene carbonate and diethyl carbonate as an electrolyte, and a polypropylene separator (Celgard 2400). FIG. 4a shows the charge/discharge capacity of the film through 50 cycles at C/20 rate considering C as 900 mAh/g. Even after 50 cycles of charge/discharge the capacity was retained near the theoretical capacity (890 mAh/g), much higher than graphite (372 mAh/g) that is commercially used as the anode material of Li-ion batteries. However, the working voltage of the embodied $Co_3O_4$ EPD film is higher than that of graphite. FIG. 4b shows the galvanostatic discharge (lithiation)–charge (delithiation) curves at C/20 which exhibits high capacity for the first discharge (1820 mAh/g) and decreased throughout cycles. This huge reduction in capacity after the first cycle is due to characteristic irreversible reactions. Additionally, there was a small capacity contribution from copper oxide thin layer of copper current collector which might be formed during oxidation. As a control experiment, an electrochemical measurement was conducted with a bare copper plate (no NP film) that was treated with the same oxidation process. This heat-treated copper plate showed a capacity of about 240 mAh/g for the first discharge, but dropped to 30 mAh/g for the second cycle, and became negligible after several cycles indicating that there is a small contribution to the overall capacity only for first few cycles. FIG. 4c shows the cycling performance at various current rates. This result revealed the excellent recovery of these novel films after 20 cycles of high current rates. However, at a low current rate (C/20) the samples showed discharge capacity increasing for first several cycles which indicated additional reactions for low current rate (FIG. 4a and FIG. 4c). Insight into the redox reaction was given (FIG. 4d) by a cyclic voltammetry (CV) measurement with lithium as a counter electrode at 0.5 mV/s. The peaks of the CV cycle for the EPD films are well matched with other $Co_3O_4$ nanomaterials. The first cycle of CV shows broad oxidation peaks around 1.5 V and 2.15 V and one reduction peak at 0.63 V that becomes two peaks in the second cycle around 1.26 V and 0.84 V.

Figure 5:
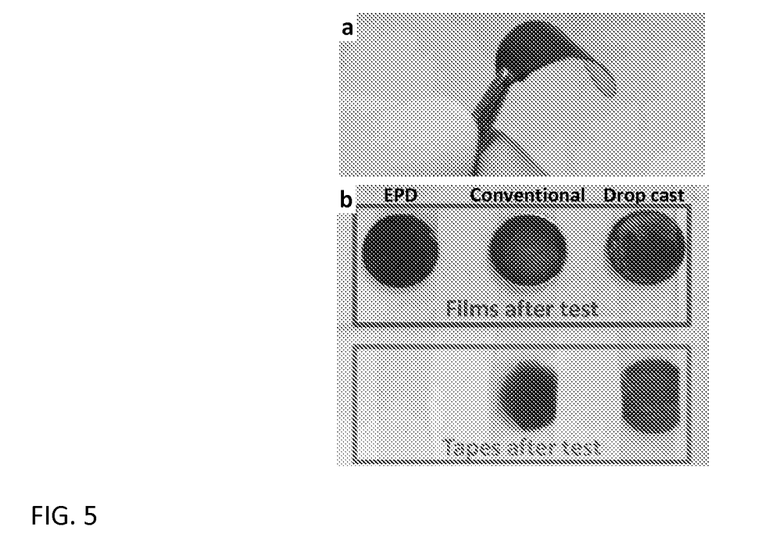
FIG. 5 shows mechanical stability test of $Co_3O_4$ nanoparticle films: (a) EPD film bends without any noticeable cracks. (b) Scotch tape method is used for adhesion test. Films in the middle blue box show the electrodes after the adhesion test. The films are prepared on copper plates by EPD (left), the conventional method (center), and drop-casting (right). The tapes after the test are shown in the bottom red box. The tape tested for EPD film (left) shows no noticeable nanoparticles while those for conventional (center) and drop casting (right) film exhibit a significant amount of black film that has de-adhered from the electrodes.

In order to understand how the embodied EPD films differ from films formed by other techniques one may compare the embodied EPD method against drop-casted films and conventional slurry coated film with polymeric binder and carbon black. Drop-casting is a widely used method to form NP films. The drop-cast film of NPs was prepared by depositing cobalt nanoparticles dispersed in solvents with different boiling points (B.P.) such as hexane (low B.P.) and tetrachloroethylene (high B.P.) onto a substrate by evaporation of solvents and then calcinating the particles under identical conditions (200° C. for 2 hours in air). The conventional film is prepared by mixing $Co_3O_4$ NPs with PVDF (polyvinylidene fluoride) and carbon black. The total amount of NPs deposited through drop-casting and the conventional film is controlled to be that of the EPD films. One may investigate the mechanical stability of all three following samples with $Co_3O_4$ nanoparticles: 1) NP films assembled through EPD, 2) NP films formed by drop-casting, and 3) NP films with PVDF and carbon black prepared through conventional methods. A bending test and an adhesion test were carried out to examine the mechanical firmness. Bending experiments were carried out up to the curvature with 0.35 cm radius. All samples did not show any noticeable cracking. FIG. 5a shows the bent EPD NP film. An adhesion test was also used to evaluate the mechanical rigidity. Scotch tape was well-attached to the sample films and pulled off. Surprisingly, the EPD film is very stable while the other films were partially de-adhered by the tape. This is shown in FIG. 5b: after the tapes were removed the conventional and drop cast samples clearly showed the black NPs removed from the copper plate (FIG. 5b, top) and the NPs sticking to the tape (FIG. 5b, bottom). The EPD film, however, exhibits little to none de-adhesion of NPs from the adhesion test. This excellent mechanical stability might provide a critical benefit for building a battery without additives.

Figure 8:
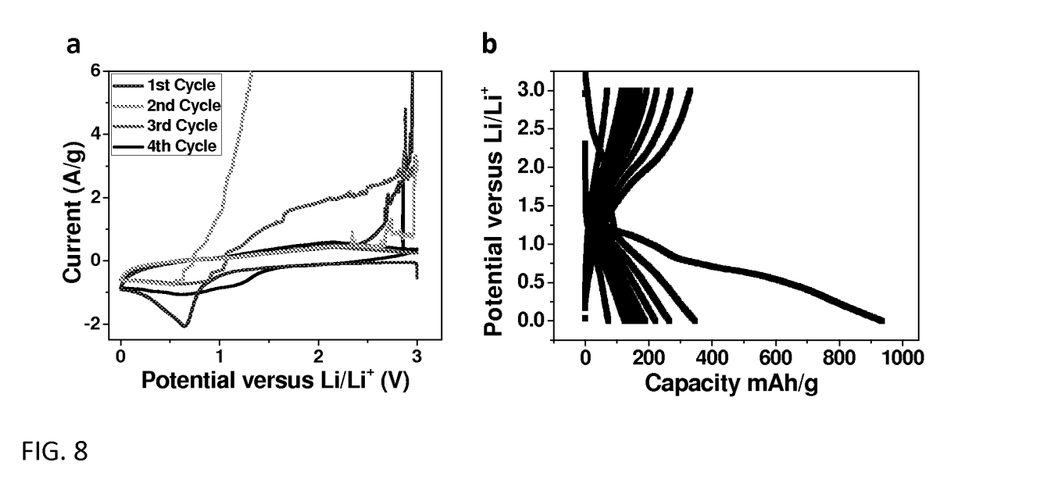
FIG. 8 shows electrochemical performance of drop casted $Co_3O_4$ NP film without any additives: (a) cyclic voltammogram at 50 mV/s (b) charging-discharging curves at C/20 rate.
Figure 9:
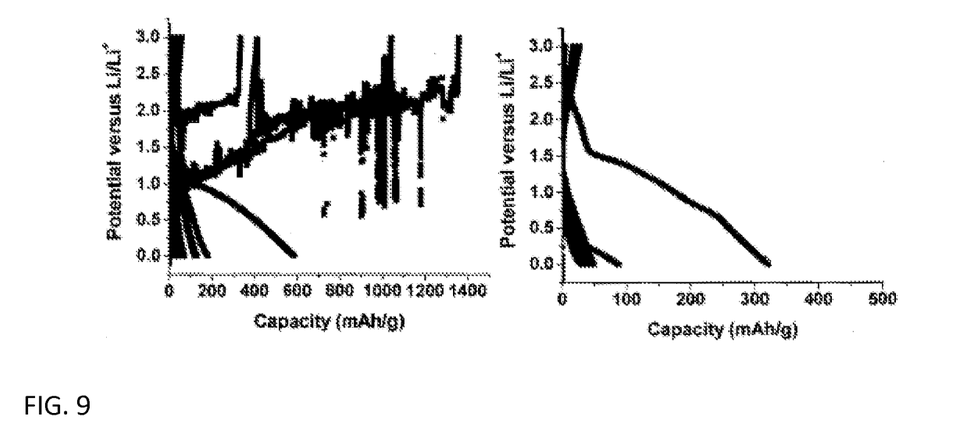
FIG. 9 shows examples of poor galvanostatic charge-discharge curves of drop casted samples. (Left): A sample shows a lot of spikes indicating bad contact between NPs and current collector. (Right): A sample shows small capacity and poor capacity retention. Charging-discharging rate is C/20.
Figure 10:
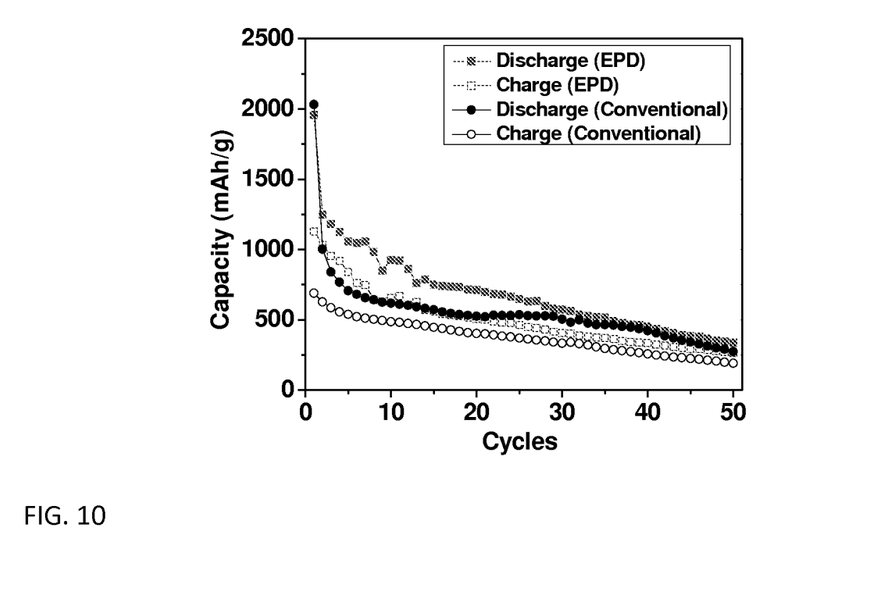
FIG. 10 shows the cycle performance of the $Co_3O_4$ NP films formed by EPD and conventional method with PVDF and carbon black. The charging-discharging rate is C/5.

Electrochemical performance was also measured for drop-casted and conventional nanoparticle films. The $Co_3O_4$ NP films formed by drop-casting and by conventional methods were assembled into a Swagelok-type electrochemical cell and measurements similar to those on the EPD films were carried out. No additional polymer binders and carbon black were added to the drop-cast sample as EPD film. Cyclic voltammetry (CV) measurement of drop-casted film with lithium as a counter electrode displayed many spikes due to poor contacts between NPs and the copper current collector, especially during the deintercalation of lithium ions from cobalt oxide film, as illustrated in FIG. 8. This poor contact deteriorated even more as charge/discharge cycles were carried out, while the EPD film showed smooth reduction and oxidation curves over all cycles. The galvanostatic measurement also revealed that the EPD films exhibited much better cycle performance than drop-casted films at C/20 rate, as illustrated in FIG. 4a. In general, most of the drop-casted films (>80%) failed to show the reasonable data without any spikes (see FIG. 9) and the cycle performance of the remaining 20% exhibit very poor capacity retention. EPD films, however, showed only a small decrease of a capacity after cycling. This result explains why polymeric binder and carbon black are needed in all other NP battery electrodes when the NPs are simply placed (drop-cast) on a current collector. The conventional slurry coated film showed similar cyclability through 50 cycles without any significant difference compared to the EPD film's performance (FIG. 10).

The volumetric capacity was calculated based on the volume of the cobalt oxide film formed through EPD and oxidation process. The density of the embodied cobalt oxide EPD film is 2.12-2.72 g/cm$^3$ which means overall packing factor of the film is about 0.35-0.45 since the density of $Co_3O_4$ phase is 6.11 g/cm$^3$. Therefore, for the high gravimetric capacity samples (890 mAh/g, measured at a low current rate) the volumetric capacity was 2100-2500 mAh/ cm³. This volumetric capacity was much higher than graphite, which is about 800 mAh/cm³ and also higher than other reported nanomaterials. For a more accurate determination of volumetric capacity, the volume expansion and contraction during discharge/charge cycles should be taken into account. Future improvements in packing factor are expected from using a slower EPD process (low V and longer deposition time) to create a higher density of NPs. Preliminary studies indicate that varying the deposition conditions can lead to denser films (~20%), but further study is necessary.

Figure 6:
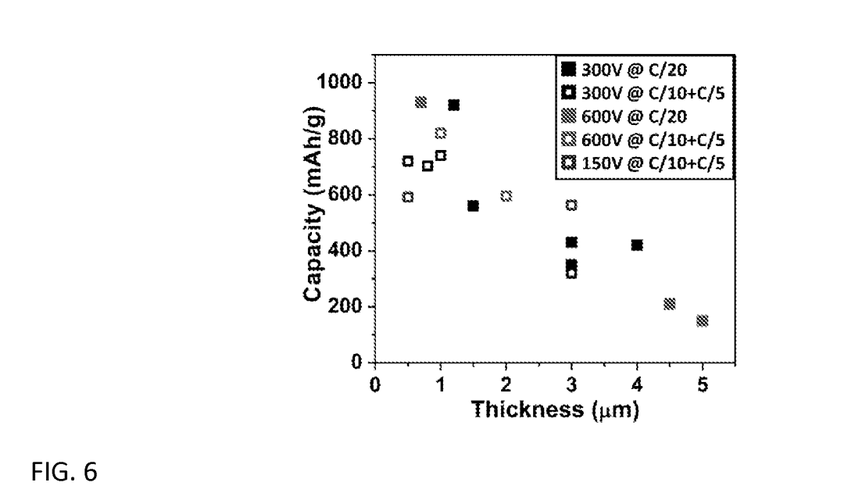
FIG. 6 shows relationship between average film thickness and the charge capacity for different applied voltages during EPD: Capacity was taken at $10^{th}$ cycle. The black solid squares and red solid squares present $10^{th}$ cycle capacities at C/20 rate for films assembled at EPD voltages of 300 V and 600 V, respectively. The open black squares, open red squares, and open blue squares show $10^{th}$ cycle capacities of 300 V, 600V, and 150 V samples, respectively, measured at C/10 rate for first 5 cycles and C/5 rate for remaining 5 cycles.

To understand the dependence on film thicknesses and EPD applied voltages, further experiments were carried out in this parameter space. To represent the cyclability, the charge capacity of the $10^{th}$ cycle of each sample was chosen. FIG. 6 shows the correlation between the cycle performance and thicknesses of films at different EPD voltages. The black solid squares and red solid squares represent the $10^{th}$ cycle charge capacities at a C/20 rate for the 300 V and 600 V EPD deposited samples, respectively. The open black squares, open red squares, and open blue squares display the $10^{th}$ cycle capacities of the 300 V, 600V, and 150 V samples, respectively, measured at C/10 rate for first 5 cycles and C/5 rate for last 5 cycles. This plot shows that the EPD voltage does not influence the cycle performance significantly within the range from 150 V to 600 V. It however clearly shows that the battery capacity strongly depends on the film thickness. The capacity decreases when the film is thicker than 1 μm, and becomes less than 20% of the theoretical capacity for a 5 μm thick sample. This thickness-dependent capacity indicates that the critical thickness of the film, in order to fully utilize battery performance, is 1 μm. It is likely that this limit is governed by the limited electrical conductivity of the oxide particles. Films with higher packing factors should improve the range of peak-performing thicknesses since higher packing implies additional connectivity pathways between NPs.

Figure 7:
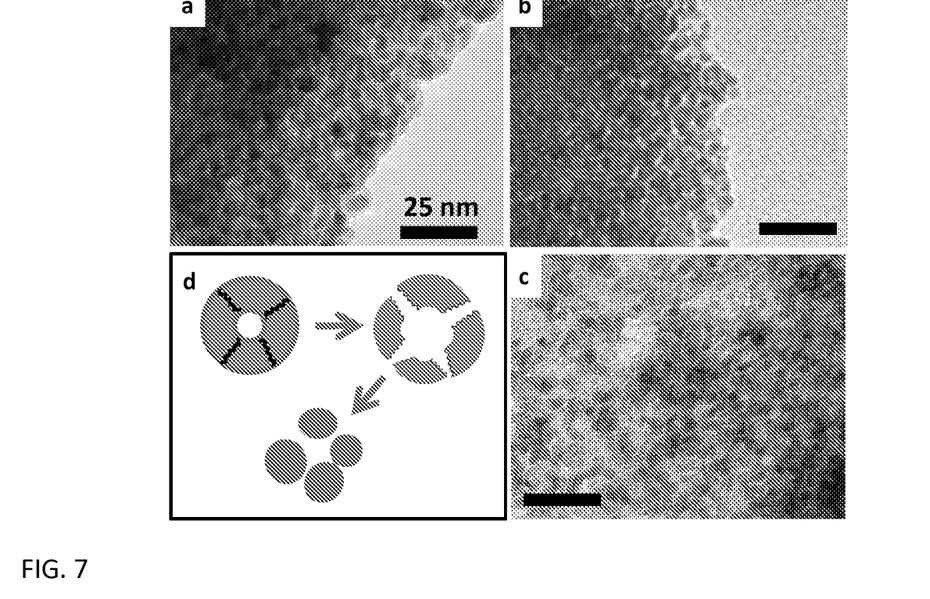
FIG. 7 shows TEM images and schematic of nanoparticles through lithiation/delithiation process: (a) after lithiation, (b) after 1 lithiation/delithiation cycle, and (c) after 30 cycles. The size of the particles are between 5 and 10 nm for (a) and ~5 nm for (b) and (c). (d) Schematic of the evolution of NPs during lithiation. Initial cobalt oxide NP is polycrystalline with hollow structure. During the lithiation process, the NP breaks into several particles and finally become individual NPs.

Due to the absence of binders and carbon black, one may study the morphology evolution during cycles. After the electrochemical measurements were completed, the Swagelok cells were disassembled and the EPD films were cleaned with diethylene carbonate, ethanol, and hexane in order to remove electrolyte residues. The samples were then scraped off from the copper current collector and put on TEM grids. FIG. 7a shows the TEM image of aggregated small NPs (size: ~5-10 nm) after first lithiation process, which reveals that the NPs are no longer individual hollow NPs. This implies that the polycrystalline hollow NPs break into smaller NPs during lithiation. Also after delithiated, NPs are even smaller (size: about 5 nm), as illustrated in FIG. 7b. These small (~5 nm) NPs remain after 30 cycles of lithiation/delithiation cycle as illustrated in FIG. 7c. These results suggest the evolution of the NPs during battery operation, as illustrated in FIG. 7d: the initial cobalt oxide NPs were polycrystalline with hollow structure, during the first lithiation step, the polycrystalline hollow NPs break into several pieces, possibly along the grain boundaries, these small NPs can reversibly accommodate lithium ions through cycles. Many nanoparticle systems have been used for size dependent electrochemical properties and each cases show different sizes for the best performance. In the embodied $Co_3O_4$ NP system, 5-10 nm may be a stable size for reversible lithiation and delithiation without pulverization.

The embodiments demonstrated a new method to build high-capacity, additive-free nanoparticle films for Li-ion battery electrodes, eliminating the need for polymeric binders and conductive carbon materials. Removing additives is an effective means to reduce the weight and volume of batteries. The embodiments employ colloidal synthesis techniques to produce spherical, monodisperse cobalt metal NPs, which are solution-processable. The critical solution-processing technique used to obtain good battery performance for the NP films is electrophoretic deposition (EPD). EPD binds the metal NPs to the surface of the electrode and to each other in an assembly, which is subsequently converted to $Co_3O_4$ NPs with a polycrystalline hollow structure.

The embodied cobalt oxide NP films formed without any binders and carbon black show excellent cyclability at low current. This EPD film exhibits superior mechanical stability to other films fabricated by drop-casting or through conventional slurry methods. The electrochemical properties are optimized when the film is 1 μm thick. By scraping off the NPs from current collectors the morphology change is studied after lithiated and delithiated. A stable particle size of 5-10 nm is retained through the lithiation/delithiation cycling.

Due to the absence of additive materials this method can provide a good template system to investigate the physical mechanisms and understand the reactions during charge/discharge. This system provides opportunities to utilize colloidal NPs for battery electrodes in a simple and robust manufacturing process.

3. Experimental Details 3.1 Electrochemical Measurement

All the electrochemical performances were tested by using the nanoparticle (NP) films as a working electrode in a Swagelok-type electrochemical cells. The cells were completed by using Li foil as the counter electrode, 1 M $LiPF_6$ in a 50:50 w/w mixture of ethylene carbonate and diethyl carbonate as an electrolyte, and a polypropylene separator (Celgard 2400) which has 43 nm pore size with 25 μm thickness. The assembling of the cell was carried out in a glove-box with oxygen and water free condition (<2 ppm). Galvanostatic electrochemical charge-discharge measurement and cyclic voltammetry were carried out using Maccor series 4000 cycle tester and Solartron analytical cell test model, respectively.

3.2 Nanoparticle Characterization

TEM images of the nanoparticle samples were obtained using a FEI Tecnai F12 microscope operating at 120 keV. About 200 particles were analyzed for Co and $Co_3O_4$ nanoparticles to obtain a size distribution. High-resolution TEM (HRTEM) was done by using a FEI Tecnai F20 microscope operating at 200 keV. XRD (X-ray diffraction) spectra were collected using a Scintag theta-theta x-ray diffractometer (Cu Kα radiation). SEM images were obtained on a LEO 1550 FESEM at an accelerating voltage of 2 kV.

3.3 Thickness Analysis

Three Co NP EPD films were prepared with different thicknesses (~470 nm, 1000 nm, and 1500 nm) by controlling the EPD conditions. In order to form the NP films on a flat substrate, the Co NP films were prepared through EPD on silicon wafers which are similar size to the copper current collector used for electrochemical measurements. The thickness of the NP films was measured on initial Co NP EPD film and the same film after oxidation by KLA-TENCOR P10 Profilometer. Three different places of each sample were scanned and averaged.

3.4 Tap Density and Pellet Density Measurement

The mixture was made with 80 wt % of embodied $Co_3O_4$ NPs and 10 wt % of carbon black (carbon black super P conductive, Alfa Aesar) and 10 wt % of PVDF (polyvinylidene fluoride, Sigma-Aldrich). The mixture was ground with pestle and mortar for 20 minutes before the density measurement. The tap density measurement was carried out as a conventional method. The NP mixture was placed in a small cylinder and tapped for 15 minutes by hand. Then the density was calculated based on the measured volume of the mixture and the $Co_3O_4$ NP mass. Solvent (NMP, N-methyl-2-pyrrolidone, Sigma-Aldrich) was then added to create a slurry from the mixture, the slurry was dried for 24 hours at 80° C., and the tap density measurements were repeated. No further increase in density was seen under these dried-slurry conditions.

The density of the dried slurry was also measured after pressed under 160 MPa by a Enerpac hydraulic press.

3.5 Contributions from Copper Oxide

As a control experiment to standard EPD cobalt oxide NP film, an electrochemical measurement was conducted with a bare copper plate (no NP film) that was treated with the same oxidation process. This heat-treated copper plate shows a capacity of about 255 mAh/g for the first discharge, but drops to 35 mAh/g for the second cycle, and become negligible after several cycles indicating that there is a small contribution to the overall capacity only for first few cycles. In order to obtain the contributions of copper oxide from FIG. 4a sample, the current rate and weight normalization are calculated based on the FIG. 4a sample's weight. Also there was no significant weight change of copper plate after oxidation process.

3.6 Adhesion Test

The adhesion test was carried out by using the Scotch tape method (Scotch Magic greener tape, 3M). About 1 cm wide tape was attached to the sample films formed on a copper plate and left it for 30 seconds and detached slowly.

3.7 NP Film Preparation by Conventional Slurry Coating

The $Co_3O_4$ NP slurry was made by mixing 80% of the $Co_3O_4$ hollow NPs and 10% of PVDF (polyvinylidene fluoride, Sigma-Aldrich) binder and carbon black (carbon black super P conductive, Alfa Aesar) in a NMP (N-methyl-2-pyrrolidone, Sigma-Aldrich) solvent dispersant. The slurry is deposited on a copper plate and dry under vacuum for 10 hours at 50° C.

4. Additional Embodiment

Figure 11A:
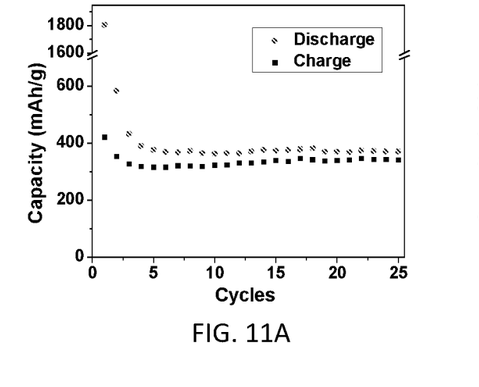
FIG. 11 shows capacity retention of $Cu_2S$ NP film ((a) left) and iron oxide NP film ((b) right) at C/10 rate showing the charge (red (i.e., lighter gray shade) circles) and discharge (black squares). The copper sulfide and iron oxide NP films were formed using electrophoretic deposition methodology in accordance with the embodiments.
Figure 11B:
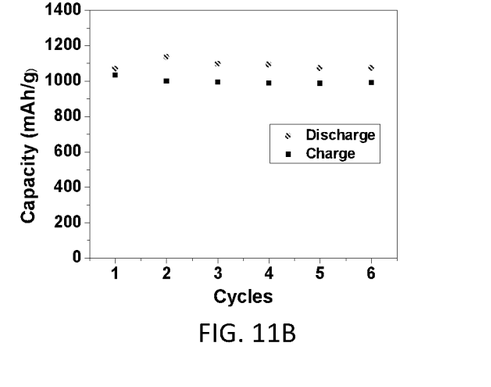

4.1 Additive Free $Cu_2S$ and Iron Oxide Nanoparticle Film for Li-Ion Battery $Cu_2S$ colloidal nanoparticles (NPs) dispersed in hexane were deposited on a copper plate (current collector) through electrophoretic deposition (EPD) technique. The $Cu_2S$ colloidal nanoparticles may be fabricated using any conventional method. The resulting $Cu_2S$ NP film coated copper plate was used as Li-ion battery electrode without additional additives such as polymeric binders and carbon black. The preliminary electrochemical measurement results show superior cyclability as shown in FIG. 11 left. The capacity of the NP film retained the theoretical capacity (~337 mAh/g) up to 25 cycles.

By adapting the method to create the cobalt oxide NP film, iron oxide NP film was developed. Iron colloidal NPs formed a film through EPD process and this iron NP film was oxidized through air oxidation at 200° C. for 2 hours. After this oxidation, the NP film became iron oxide and this film was used as a Li-ion battery electrode without additives. The cycle performance of iron oxide NP film is shown in FIG. 11 right. The capacity retained the theoretical capacity (~1000 mAh/g) for several cycles.

These preliminary results suggest that the embodied binder-free and carbon-free method is not only limited to the cobalt oxide NPs but also applicable to wide range of the NP materials.

All references, including publications, patent applications, and patents cited herein are hereby incorporated by reference in their entireties to the extent allowed, and as if each reference was individually and specifically indicated to be incorporated by reference and was set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein is merely intended to serve as a shorthand method of referring individually to each separate value falling within the range, unless otherwise indicated herein, and each separate value is incorporated into the specification as if it was individually recited herein.

All methods described herein may be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. An electrochemical apparatus comprising:
 a component comprising:
  a substrate; and
  a hollow core morphology transition metal based nanoparticle material layer located over the substrate and absent a binder material, absent a polymeric material, and absent a carbon material, wherein the hollow core morphology transition metal based nanoparticle material layer is first formed upon the substrate as a solid core morphology transition metal based nanoparticle material layer using an electrophoretic deposition method, and wherein the solid core morphology transition metal based nanoparticle material layer adhered upon the substrate is treated to provide the hollow core morphology transition metal based nanoparticle material layer;
 wherein the electrochemical apparatus is selected from the group consisting of a battery, a fuel cell, a capacitor and a catalytic reactor.

2. The electrochemical apparatus of claim 1 wherein:
 the component comprises an electrode; and
 the electrochemical apparatus is selected from the group consisting of a battery, a fuel cell and a capacitor.

3. The electrochemical apparatus of claim 1 wherein the substrate is an optically opaque substrate selected from the group consisting of a conductor substrate, a semiconductor substrate and a dielectric substrate.

4. The electrochemical apparatus of claim 1 wherein the metal nanoparticle material layer comprises a transition metal nanoparticle material layer not including vanadium, manganese, iron, titanium and nickel.

5. The electrochemical apparatus of claim 1 wherein the metal based nanoparticle material layer comprises a material selected from the group consisting of a metal oxide, a metal nitride, a metal oxynitride and a metal chalcogenide material.

6. The electrochemical apparatus of claim 1 wherein the metal based nanoparticle material layer comprises a transition metal based nanoparticle material layer not including vanadium, manganese, iron, titanium and nickel.

7. The electrochemical apparatus of claim 1 wherein the electrochemical apparatus comprises a battery.

8. The electrochemical apparatus of claim 1 wherein the electrochemical apparatus comprises a fuel cell.

9. The electrochemical apparatus of claim 1 wherein the electrochemical apparatus comprises a capacitor.

10. The electrochemical apparatus of claim 1 wherein the electrochemical apparatus comprises a catalytic reactor.

11. The electrochemical apparatus of claim 1 further comprising an optically opaque enclosure into which is assembled the component.

12. The electrochemical apparatus of claim 1, wherein the hollow core is spherical.

* * * * *